(12) United States Patent
Schulze Selting et al.

(10) Patent No.: US 9,526,210 B2
(45) Date of Patent: Dec. 27, 2016

(54) DRAPER PLATFORM WITH CENTER SECTION AND LATERAL SECTIONS ARRANGED LATERALLY TO THE CENTER SECTION

(71) Applicant: Carl Geringhoff GmbH & Co. KG, Ahlen (DE)

(72) Inventors: Stephan Schulze Selting, Enniger (DE); Dirk Webermann, Senden (DE); Jan Bernd Schulze Rückamp, Ennigerloh-Enniger (DE); Steffen Sudhues, Ahlen (DE); Michael Pokriefke, Hude (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 0 days.

(21) Appl. No.: 14/749,668

(22) Filed: Jun. 25, 2015

(65) Prior Publication Data
US 2015/0373909 A1    Dec. 31, 2015

(30) Foreign Application Priority Data

Jun. 25, 2014 (DE) .................. 10 2014 009 156

(51) Int. Cl.
| | |
|---|---|
| A01D 43/00 | (2006.01) |
| A01D 61/00 | (2006.01) |
| A01D 41/14 | (2006.01) |
| A01D 41/12 | (2006.01) |
| A01D 61/02 | (2006.01) |

(52) U.S. Cl.
CPC ............. *A01D 61/002* (2013.01); *A01D 41/12* (2013.01); *A01D 41/144* (2013.01); *A01D 61/02* (2013.01)

(58) Field of Classification Search
CPC ........ A01D 41/14; A01D 57/20; A01D 43/06; A01D 61/002; A01D 41/16
USPC .................................................... 56/181, 153
See application file for complete search history.

(56) References Cited

U.S. PATENT DOCUMENTS

| | | | | |
|---|---|---|---|---|
| 6,272,823 B1* | 8/2001 | Yeomans | ............... | A01D 41/14 56/158 |
| 6,675,568 B2* | 1/2004 | Patterson | ............... | A01D 41/14 56/208 |
| 7,478,522 B1* | 1/2009 | Lovett | .................... | A01D 41/14 56/296 |
| 7,614,206 B2* | 11/2009 | Tippery | ............... | A01D 41/144 56/15.8 |

(Continued)

*Primary Examiner* — Arpád Fábián-Kovács
(74) *Attorney, Agent, or Firm* — Gudrun E. Huckett

(57) ABSTRACT

A draper platform for a combine harvester has a center section attachable to a feed channel of the combine harvester. Lateral sections are arranged laterally on opposite ends of the center section. The center section has a center frame; the lateral sections have a lateral frame and are pivotable relative to the center section about a pivot axis that is oriented in travel direction of the draper platform. A cutter bar is provided and pivotable arms having a first end connected to the cutter bar and a second end connected to the center frame or the lateral frames connect the cutter bar pivotably to the center section and the lateral sections. Drive devices are operatively connected to the cutter bar and conveying devices that convey cut stalk material. The pivotable arms are arranged such that less than one of them is present per meter of working width of the draper platform.

7 Claims, 3 Drawing Sheets

(56) References Cited

U.S. PATENT DOCUMENTS

| | | | | |
|---|---|---|---|---|
| 7,918,076 | B2* | 4/2011 | Talbot | A01D 41/14 56/208 |
| 7,930,871 | B1* | 4/2011 | Figgins | A01D 41/141 56/208 |
| 7,992,372 | B1 | 8/2011 | Coers et al. | |
| 8,087,224 | B1* | 1/2012 | Coers | A01D 41/144 56/153 |
| 8,347,594 | B1* | 1/2013 | Lovett | A01D 41/14 56/257 |
| 2007/0193243 | A1* | 8/2007 | Schmidt | A01D 41/14 56/181 |
| 2009/0277146 | A1* | 11/2009 | Sauerwein | A01D 41/14 56/208 |
| 2012/0042617 | A1* | 2/2012 | Dow | A01D 61/002 56/14.5 |
| 2012/0291412 | A1* | 11/2012 | Lovett | A01D 61/002 56/181 |
| 2013/0097986 | A1* | 4/2013 | Lovett | A01D 41/14 56/153 |
| 2014/0041354 | A1* | 2/2014 | Coon | A01D 41/14 56/158 |
| 2014/0075912 | A1* | 3/2014 | Fuechtling | A01D 41/14 56/181 |

* cited by examiner

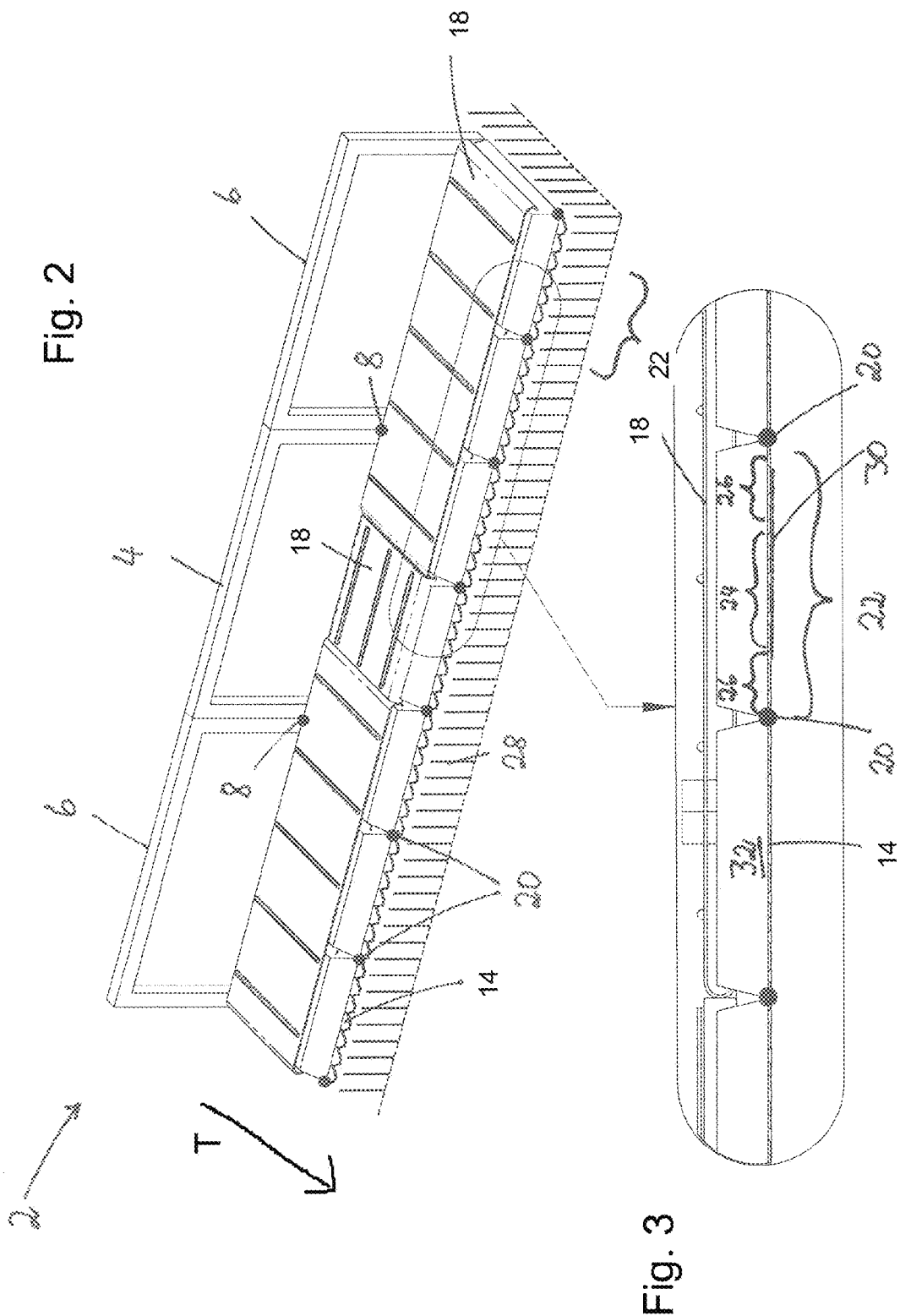

DRAPER PLATFORM WITH CENTER SECTION AND LATERAL SECTIONS ARRANGED LATERALLY TO THE CENTER SECTION

BACKGROUND OF THE INVENTION

The present invention relates to a draper platform for attachment to a combine harvester and comprising: a center section that is attachable to the feed channel of a combine harvester and lateral sections arranged laterally thereto, wherein the lateral sections are pivotable about a pivot axis that is oriented at least approximately in travel direction; a cutter bar that is supported by several arms pivotably connected to a frame of the center section or of a lateral section; conveying devices for conveying the cut stalk material; and drive devices for driving the cutter bar and the conveying devices.

U.S. Pat. No. 7,992,372 discloses a draper platform of the aforementioned kind. In addition to the rigid knife holders on the exterior sides, there are also eight pivotably supported arms each on the lateral sections that secure the cutter bar and six pivotably supported arms are mounted on the center section that secure the cutter bar. Across the width of the three-part draper platform, there are therefore, for a predetermined working width, 22 pivotably supported support arms on which the cutter bar is secured. The support arms have a uniform lateral spacing of approximately 76 cm relative to each other. In this way, the draper platform can adapt easily to a different ground contour in transverse direction; this is advantageous, in particular for great working widths of more than 8 m and crop that is to be cut as low as possible to the ground, for example, soybean.

It is the object of the present invention to improve the known draper platform.

SUMMARY OF THE INVENTION

This object is solved for a draper platform of the aforementioned kind in that less than one pivotable arm is present per meter of working width of the draper platform, on average of the total working width.

By reducing the number of arms, the weight of the draper platform as a whole is lowered; also, its manufacturing costs can be reduced. For example, in case of a draper platform with 10 m working width, a lateral spacing of the pivotable arms of 1 m relative to each other, and two stationary arms on the exterior sides, only nine such arms can be sufficient in order to copy with the cutter bar the contour of the ground of a field to be harvested while in the device according to the prior art twelve such arms would be required. For a spacing of the pivotable arms relative to each other of 1.5 m, six pivotable arms instead of twelve would be sufficient: this corresponds to cutting in half the number of arms. Due to the reduced number of pivotable arms, the draper platform becomes much lighter for identical working width, in particular also the lateral sections, so that the expenditure for compensating the carrying forces for the lateral sections on the central section of the draper platform as well as on the holders relative to and on the feed conveyor of the harvesting machine is reduced also. Surprisingly, the ground adaptation of the cutter bar relative to the ground contour is hardly deteriorating because the theoretically possible pivot travel of the pivotable arms in the arrangement according to the prior art is limited by the limited flexibility of the cutter bar.

The merit of the present invention is to be viewed in the recognition that the limited flexibility of the cutter bar can be utilized almost completely even with only a few pivotable arms. In this context, the spacing of the pivotable arms within the area of the center section and of the lateral sections of the draper platform must not be uniform everywhere. In particular, the spacing of the pivotable arms which are pivotably connected to the center section and to the lateral sections, respectively, can vary relative to each other. Also, different spacings can result between neighboring pivotable arms which are arranged in the joining area of the central section to the respective lateral sections or in the joining area of an inner lateral section to an outer lateral section.

According to one embodiment of the invention, the cutter bar is provided across its working width with different stiffness. Due to the different stiffness, individual sections of the cutter bar of a softer design can deform more strongly than other sections that are stiffer. In this way, it is possible to maintain the ground adaptation capability of the cutter bar, despite the reduced number of pivotable arms, at a level comparable to the prior art in that due to the different stiffness of the cutter bar across its working width height differences can also be compensated at least partially by the cutter bar itself without a corresponding pivoting action of the pivotable arms in the height direction. Also, the areas of the cutter bar that are less stiff enable the pivotable arms to move more easily across the theoretically possible pivoting stroke. Accordingly, individual pivotable arms can carry out greater pivot travels without thereby at least partially entraining neighboring pivotable arms or the entrainment movement is significantly shorter in comparison to a cutter bar that is embodied with uniform stiffness because a portion of the entrainment movement is compensated by the more flexible sections of the cutter bar.

According to one embodiment of the invention, a cutter bar section between two neighboring pivotable arms is embodied in its central area more stiffly than in its lateral areas. Due to the stiffer configuration of the central area, this area will sag less strongly in downward direction than a less stiff configuration. Accordingly, the cutting pattern of the stubble on the field is less wavy than in the case without stiffening. The reduced bending stiffness in the lateral areas permits on the other hand a stronger bending movement of this cutter bar section as a whole so that the adaptation movements of the cutter bar relative to a changing ground contour, as the harvesting machine advances into the crop stand, are facilitated.

According to one embodiment of the invention, the securing bar of the cutter bar comprises a thicker material section in a stiffer section in comparison to a less stiff section. The thicker material section can be, for example, in the form of a monolithic securing bar itself that is embodied to be thicker in sections thereof or the securing bar itself is uniformly thick across its length and only within the stiffer sections additional reinforcement strips are joined with the securing bar. Aside from the length of the securing bar in the direction of the working width of the draper platform, the securing bar can be varied across the length also in regard to its height and/or depth in order to affect in this way the bending behavior in the inventive sense.

According to one embodiment of the invention, in a section of the cutter bar between two neighboring pivotable arms, the central area of this section is reinforced across a length of five tenths up to eight tenths of the width of this section. Here, the length dimension is to be understood also as the length in the direction of the working width. Accordingly, the outer portions of this section in a length of at least one tenth of the width of this section can be without reinforcement, respectively. As a lower limit, the central area is reinforced by at least five tenths of the width of this section, wherein then the lateral areas each are not reinforced for 2.5 tenths. The reinforcement can be embodied to be differently strong across its length and in the central area the reinforcement can be interrupted section-wise once or several times, wherein in this context the reinforced proportion as a whole should however still amount to a length proportion of five tenths to eight tenths of the length of the section of the cutter bar between two neighboring pivotable arms.

According to one embodiment of the invention, on the lateral sections fewer than five, preferably three, pivotable arms and on the center section fewer than four, preferably two, pivotable arms are attached.

According to one embodiment of the invention, the two arms that are neighboring a pivot axis of a lateral section relative to another lateral section or relative to the center section are displaced in lateral direction relative to the pivot axis on the center section and on the lateral section. Due to the lateral displacement of the pivotable arms relative to the pivot axis of the lateral sections, upon pivot movement of a lateral section with an end which is facing away from the center section about the pivot axis in upward or downward direction, both pivotable arms neighboring the pivot axis are entrained to perform an appropriate movement in upward or downward direction. Due to the upward or downward movement of two pivotable arms neighboring the pivot axis, the bending angle to which the cutter bar would otherwise be exposed in the area of the pivot axis is divided between the two fastening points of the cutter bar on the pivotable arms neighboring the pivot axis. The at least two divided bending angles that are thus reduced at the points of attack load the cutter bar significantly less than a stronger bending action of the cutter bar in the area of the pivot axis. When the pivot angle in the area of the pivot axis is e.g. 10°, due to the division of this pivot angle onto the points of attack of two pivotable arms, a remaining bending angle of only 5° results that the material of the cutter bar can assume even during operation without being damaged.

Further modifications and embodiments of the invention can be taken from the following description and the drawings.

BRIEF DESCRIPTION OF THE DRAWINGS

The invention will be explained in the following with the aid of an embodiment in more detail.

FIG. 2 is a perspective front view of a draper platform.

FIG. 3 shows in an end view a detail enlargement of the area indicated in FIG. 2.

DESCRIPTION OF PREFERRED EMBODIMENTS

Figure 1:
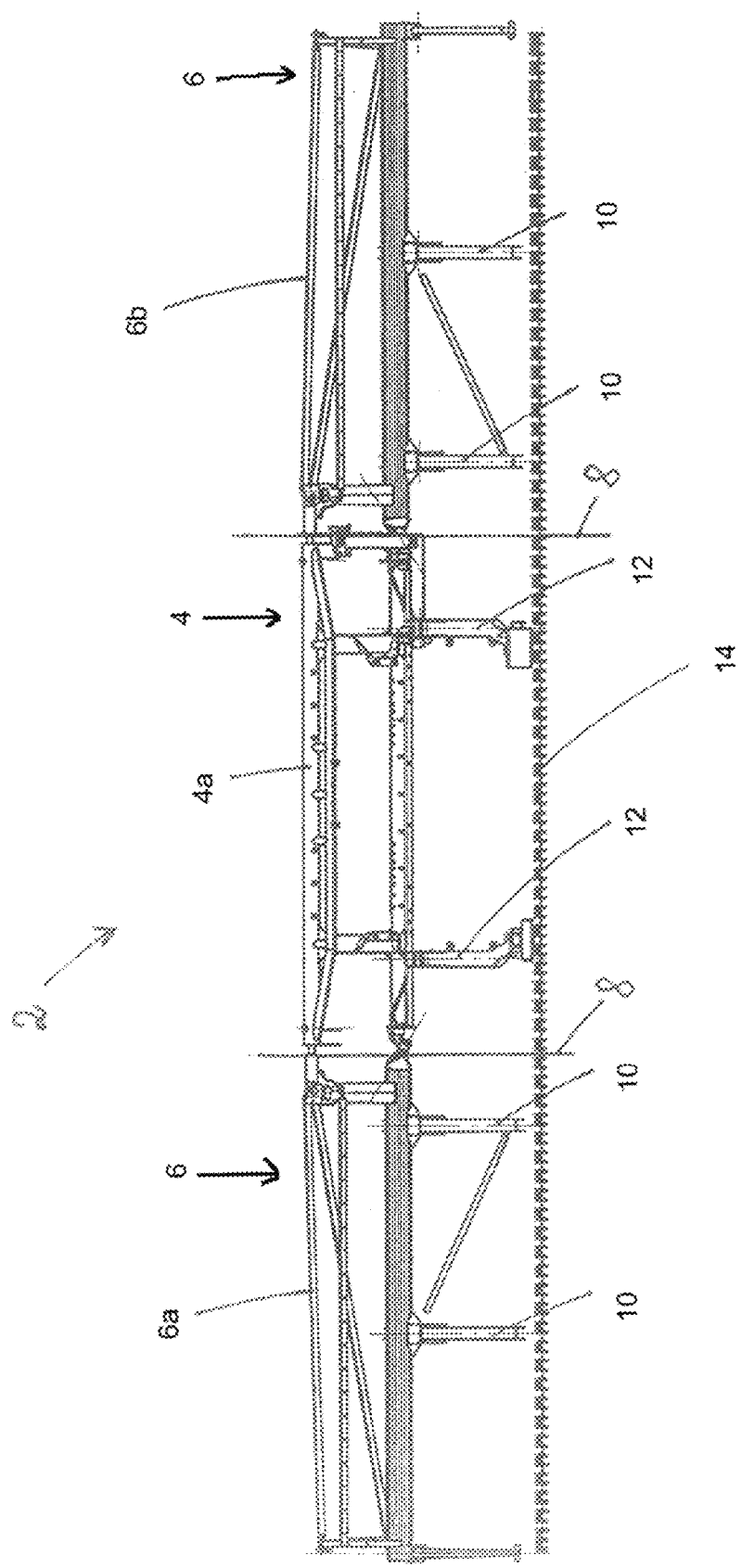
FIG. 1 shows a top view of a frame of a draper platform with attached cutter bar.

In the attached drawing, the basic configuration of a draper platform 2 is illustrated. The draper platform 2 comprises a center section 4 and two lateral sections 6 adjoining it laterally. By means of the central section 4, the draper platform 2 can be connected to a harvesting machine, for example, the feed channel of a combine harvester not illustrated in more detail in the drawing. The center section 4 comprises a center frame 4a and the lateral sections 6 each comprise a lateral frame 6a, 6b wherein the lateral frames 6a, 6b of the lateral sections 6 are connected to opposite ends of the center frame 4a of the center section 4 so as to be pivotable about a pivot axis 8, respectively. The pivot axis 8 may be aligned precisely with the forward travel direction of the draper platform 2 but it can also deviate from the forward travel direction T by a few degrees.

For reasons of simplification, the conveying devices 18 that the draper platform 2 is provided with in the completely mounted state are not illustrated in FIG. 1, but are shown in FIG. 2. They can be, for example, several draper conveyors of which two are arranged in the area of the lateral sections 6 and transport the cut stalk material toward each other so that it is combined at the central part of the draper platform 2 on a further draper conveyor arranged thereat. In the central part of the draper platform 2 in the area of the central section 4, the draper conveyor transports the received stalk material in rearward direction in the direction of the feed channel of the combine harvester.

In the top view of the draper platform 2 illustrated in FIG. 1, the pivotable arms 10 can be seen which are arranged in the area of the lateral sections 6 as well as the pivotable arms 12 which are arranged in the area of the center section 4. The pivotable arms 10, 12 each are connected by a fixed pivot axis with their end facing the lateral section 6 or the central section 4 to the sections, respectively, while its oppositely positioned pivotable end is connected to the cutter bar 14. By means of an upward or downward pivot movement of the arms 10, 12, the cutter bar 14 can adapt to the respective ground contour.

In the embodiment according to the attached Figures, the draper platform 2 is combined of three frame parts (center frame 4a and two lateral frames 6a, 6b) and comprises six pivotable arms 10, 12 which, together with the rigid knife holders at the outer ends of the draper platform, secure the cutter bar 14 comprising seven partial sections. The partial sections of the cutter bar 14 are substantially bending resistant between the pivotable arms 10, 12. Upon pivot movements of individual or several pivotable arms 10, 12, bending radii are produced in particular in the area of the arms 10, 12.

Pivotable arms 10, 12 neighboring the pivot axis 8 are positioned relative to the pivot axis 8 at a significant lateral spacing. In this way, upon pivot movement of a lateral section 6 relative to the center section 4 pivot movements of both neighboring pivotable arms 10, 12 result which therefore move and bend the cutter bar 14 with reduced bending radii across a width that is greater than the immediate area in which the bending angle resulting from the pivot movement of the lateral section 6 about the pivot axis 8 otherwise would act on the cutter bar 14.

In FIG. 2, a perspective front view of the draper platform 2 is illustrated. Here, the draper platform 2 is also of a three-part configuration comprising a center section 4 and two lateral sections 6 adjoining it laterally. The pivot axes 8 are indicated by black dots. After the cut, the cut crop is conveyed by means of the draper conveyors of the conveying devices 18 to the feed channel of a combine harvester, not illustrated in the drawing. The cutter bar 14 is connected at eight securing points 20, illustrated by black dots, to the draper platform 2. The securing points 20 are the ends of pivotable arms 10, 12 which are not visible in this illustration.

Figure 4:
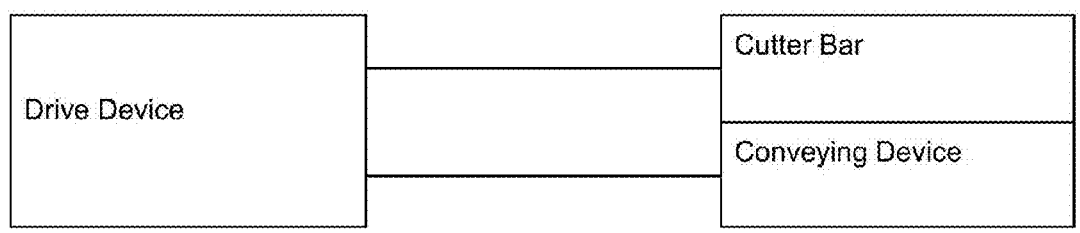
FIG. 4 shows schematically a drive device connected to cutter bar and conveying device.

Drive device(s) for driving the cutter bar and the conveying devices is/are provided, as schematically shown in FIG. 4.

Between two neighboring securing points 20, a cutter bar section 22 is located which in FIG. 3 is illustrated in an enlarged end view of the area that is indicated in FIG. 2. In the embodiment, a total of seven cutter bar sections 22 are formed. The cutter bar section 22 of the cutter bar 14 comprises a central area 24 and two lateral areas 26 adjoining it laterally. While the central area 24 is reinforced, the two lateral areas 26 can be embodied to be less stiff than the central area 24. In front of the draper platform 2, the stalks 28 of the crop to be harvested are illustrated in a row.

In FIG. 3, in a cutter bar section 22 a reinforcement strip 30 is indicated in an exemplary fashion; by means of the reinforcement strip 30, the cutter bar 14 is stiffened in the central area 24 of the cutter bar section 22. The reinforcement of a cutter bar section 22 is possible also by means of the transfer plate 32 in that the central area 24, but not the lateral areas 26, of the cutter bar section 22 is connected fixedly with the transfer plate 32

When the draper platform 2 illustrated in FIG. 3 moves across a hump that is projecting from the remaining environment, the securing point 20 moves upward, following the height of the hump, and later on returns into the initial position in order to thus slide across the hump. In this way, the securing point 20 is also caused by the movement of the pivotable arm 10, 12 to move first upwardly and to then drop again. During this movement, the upwardly moving securing point 20 causes the otherwise horizontally positioned cutter bar section 22 to be entrained upwardly at its one end so that in this way a slanted spatial position of cutter bar section 22 is adjusted, enabling also its movement across the hump without impact. On the backside of the hump, the pivotable arm 10, 12 with the securing point 20 can move downwardly again and the cutter bar section 22 returns again into its approximately horizontal position. In this context, the flexibility of the cutter bar section 22 as a whole is increased by the lateral areas 26 of the cutter bar section 22 that are less stiff in comparison to the stiffer central area 24.

The specification incorporates by reference the entire disclosure of German priority document 10 2014 009 156.2 having a filing date of Jun. 25, 2014.

The afore described embodiment serves for explaining the invention. The invention is not limited to the embodiment. A person of skill in the art will have no difficulties in modifying the embodiment in a way appearing suitable to him in order to adapt it to a concrete application situation without deviating thereby from the teachings of the invention.

While specific embodiments of the invention have been shown and described in detail to illustrate the inventive principles, it will be understood that the invention may be embodied otherwise without departing from such principles.

What is claimed is:

1. A draper platform for attachment to a combine harvester, the draper platform comprising:

a center section adapted to be attached to a feed channel of a combine harvester, the center section comprising a center frame;

lateral sections arranged laterally on opposite ends of the center section, wherein the lateral sections each comprise a lateral frame and are pivotable relative to the center section about a pivot axis that is at least approximately oriented in a travel direction of the draper platform;

a cutter bar;

pivotable arms having a first end connected to the cutter bar and a second end connected to the center frame or the lateral frames, respectively, so that the cutter bar is pivotably connected to the center section and the lateral sections;

conveying devices adapted to convey cut stalk material;

drive devices operatively connected to the cutter bar and the conveying devices;

wherein the pivotable arms are arranged such that less than one of the pivotable arms is present per meter of the working width of the draper platform on average relative to the total working width;

wherein the cutter bar has a stiffness that varies across the working width and a cutter bar section of the cutter bar between two of the pivotable arms neighboring each other is embodied stiffer in a central area of the cutter bar section than in lateral areas of the cutter bar section so that a stiffer section and less stiff sections are formed.

2. The draper platform according to claim 1, wherein a securing bar of the cutter bar has a thicker material section in the stiffer section of the cutter bar in comparison to the less stiff sections of the cutter bar.

3. The draper platform according to claim 1, wherein the stiffer section in the central area is reinforced across a length of five tenths up to eight tenths of the width of the cutter bar section.

4. The draper platform according to claim 1, wherein on the lateral sections less than five of the pivotable arms and on the central section less than four of the pivotable arms are mounted.

5. The draper platform according to claim 4, wherein on the lateral sections three of the pivotable arms and on the central section two of the pivotable arms are mounted.

6. The draper platform according to claim 1, wherein two of the pivotable arms that are neighboring the pivot axis connecting the lateral section and the center section are displaced in lateral direction relative to the pivot axis into the center section and into the lateral section.

7. The draper platform according to claim 1, wherein the two pivotable arms that are neighboring the pivot axis of the lateral section connecting the lateral section to another lateral section are displaced in lateral direction relative to the pivot axis into the lateral sections.

* * * * *